June 4, 1957   C. S. STEADMAN ET AL   2,794,601
HEATING AND VENTILATING SYSTEMS FOR VEHICLES
Filed Jan. 5, 1953   2 Sheets-Sheet 1

E. J. SKINNER
C. S. STEADMAN
Inventor

By Moore & Hall
Attorneys

June 4, 1957   C. S. STEADMAN ET AL   2,794,601
HEATING AND VENTILATING SYSTEMS FOR VEHICLES Filed Jan. 5, 1953   2 Sheets-Sheet 2

E. J. Skinner
C. S. Steadman
Inventor

By Moore & Hall
Attorneys

United States Patent Office
2,794,601
Patented June 4, 1957

2,794,601

HEATING AND VENTILATING SYSTEMS FOR VEHICLES

Clifford S. Steadman, Surbiton, and Ernest J. Skinner, Dollis Hill, London, England, assignors to Smiths America Corporation, Ruxton, Md.

Application January 5, 1953, Serial No. 329,548

11 Claims. (Cl. 237—12.3)

The present invention relates to heating and ventilating systems for vehicles with liquid-cooled internal combustion engines of the kind in which heat in addition to or alternatively to that obtainable from the engine cooling system is utilised for heating air for supply to the vehicle interior, the heat being obtained, for example, by burning fuel in a suitable device.

It has been proposed to provide a heater in which fuel is burnt and heat is transferred directly from the products of combustion to air used for heating the vehicle interior via a first heat exchanger.

It has also been proposed to provide a heater in which fuel is burnt and heat is transferred from the products of combustion to the engine coolant via a first heat exchanger and from the engine coolant to air for heating the vehicle interior via a second heat exchanger.

The first-mentioned system has the advantages of simplicity and rapid heating of the vehicle interior, and enables the vehicle to be kept warm with a minimum expenditure of fuel when it is stationary. It has the disadvantage that it is not possible to use the heater to heat the engine coolant to ensure easy starting; and there may also be difficulty in obtaining a sufficiently close control of temperature when the maximum output from the heater is not required.

The second-mentioned system has the advantages that the engine coolant can be heated for starting purposes, and a close control of temperature of the vehicle interior can be obtained by operating the heater intermittently, the thermal capacity of the engine cooling system serving to reduce fluctuations to an acceptably low level. The chief disadvantage of this second system is the extra cost necessitated by the provision of two heat exchangers, each of which has to be capable of transferring the whole of the combustion heater output.

It is the object of the present invention to provide a heater of the kind referred to in which the advantages of the two types of heater mentioned above are largely obtained and their disadvantages largely avoided.

According to the present invention we provide in a system of the kind referred to a heat exchanger adapted to transfer heat between the engine coolant and the air supplied to the vehicle interior and a valve-controlled by-pass for the said heat exchanger whereby heat may or may not be transferred between air and coolant according to the setting of the valve controlling the by-pass.

According to a first form of the invention the by-pass valve controls the flow of air through the heat exchanger, in one extreme position of the by-pass valve air being permitted to flow through the exchanger and in the other extreme position being prevented from flowing therethrough.

According to a second form of the invention the by-pass valve controls the flow of coolant through the heat exchanger, in one extreme position of the by-pass valve coolant being permitted to flow through the exchanger and the other extreme position being prevented from flowing. In the second position it will be appreciated that the coolant will probably vaporise.

Systems embodying the first and second forms of the invention will now be described with respect to the accompanying drawings, of which:

Figure 1:
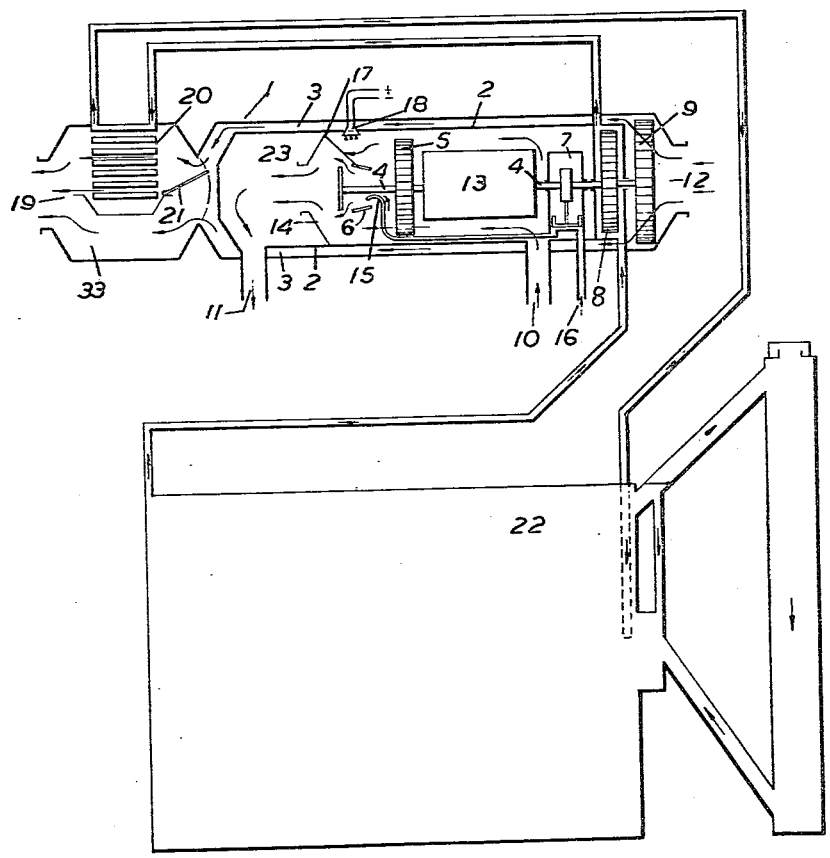
Figure 1 is a partially schematic longitudinal sectional diagram of the first form of the invention.

The system of Figure 1 comprises a generally cylindrical main housing 1 within which is situated an interior housing 2, the main and interior housings being spaced apart so as to define an annular air space 3. There are mounted within the interior housing 2 a two-speed electric motor 13 whose shaft 4 drives a combustion air blower 5, a centrifugal fuel distributor 6, a fuel pump 7, a water impeller 8 and a fresh air blower 9 all of which are situated inside the interior housing 2 except the fresh air blower 9. Air is admitted to the interior housing through opening 10 and exhausted through opening 11 (both these latter being outside the vehicle) while air is admitted to the annular space 3 through opening 12. The interior housing has an internal frustro-conical jet defining wall 14. Fuel pump 7 draws fuel from a fuel inlet pipe 16 and feeds it to a fuel jet 15. The fuel strikes the frustro-conical portion 17 of distributor 6 and is flung outwards and uniformly distributed by centrifugal force. An electrically heated filament 18 is provided to ignite fuel from the distributor 6. Air from the annular air space 3 is fed either direct to the vehicle interior through by-pass 33 and opening 19 or to the vehicle interior through the liquid-air heat exchanger 20 and opening 19, depending upon the position of valve 21. Coolant liquid is drawn from the engine cooling system, indicated at 22, by impeller 8 and fed to the "liquid" portion of heat exchanger 20, returning therefrom to the engine cooling system.

It will be seen that when motor 13 is running, fuel supplied, and filament 18 heated, that the fuel will be burnt in the combustion chamber 23 formed by wall 14 and the wall of the interior housing 3, the products of combustion being exhausted to the atmosphere through opening 11. The portion of the annular space 3 between chamber 23 and the inner wall of housing 2 constitutes a heat exchanger between the heated products of combustion in chamber 23 and cooler air passing through annular space 3.

The functioning of the apparatus will be most clearly seen in considering the operation of the heater in starting from cold.

(1) Motor 13 is set to run at full speed, filament 18 heated, and valve 21 set into the position in which all the air passing through annular space 3 passes through heat exchanger 20. Fresh air passing through space 3 is heated, and a major part of its heat transferred to the engine coolant (circulated through exchanger 20 by impeller 8). When the engine coolant has reached a suitable temperature, the engine can be started.

(2) Valve 21 is positioned to pass the heated fresh air direct to the vehicle interior through by-pass 33.

(3) When the vehicle interior reaches the desired temperature the speed of motor 13 is reduced, so reducing the supply of heat to the vehicle interior.

(4) If the supply of heat to the vehicle interior is too great for the maintenance of the desired temperature the heated air may be wholly or partially diverted through exchanger 20 by suitable positioning of valve 21 (the excess heat then being dissipated through the engine cooling system).

(5) If the heat supply is still too great the supply of fuel is cut off, so that the air is then heated by the engine coolant in exchanger 20.

(6) When unheated air is required the whole of the air flow is diverted through by-pass 33.

Figure 2:
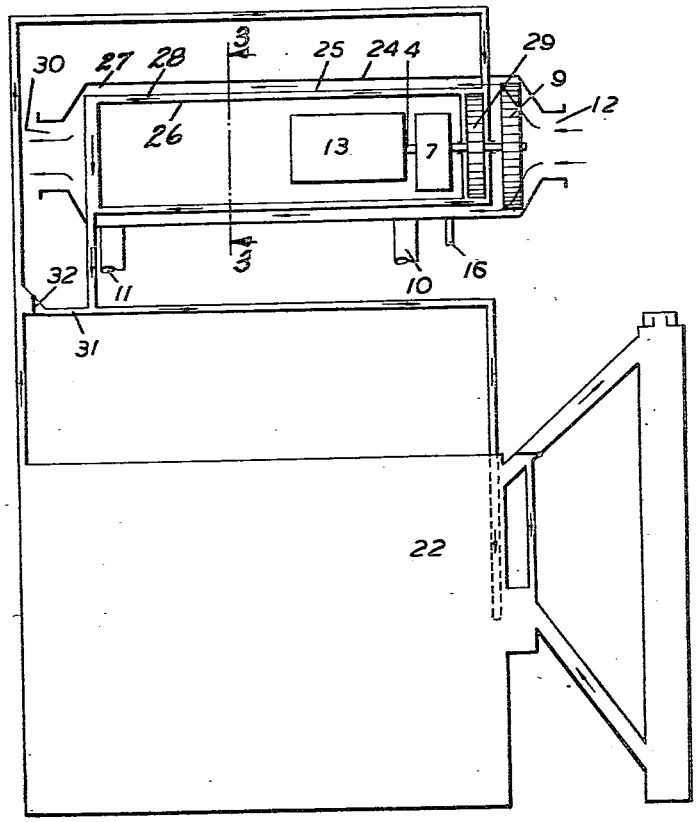
Figure 2 is a partially schematic longitudinal sectional diagram of the second form of the invention.
Figure 3:
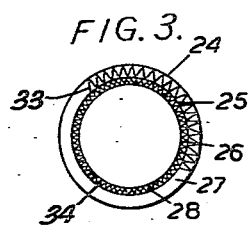
Figure 3 is a part transverse section on the line 3—3 of Figure 2.

The system of Figures 2 and 3 will now be described. This comprises a generally cylindrical external housing 24 within which are situated an intermediate housing 25 and an interior housing 26. The outer and intermediate housings 24 and 25 define an annular air space 27 while the intermediate and inner housings 25 and 26 define an annular liquid-tight space 28. The air and liquid-spaces are provided with sets of heat transfer fins 33 and 34 respectively. The inner housing contains a motor 13, fuel pump 7, and a fuel distributor, combustion air blower, igniter filament, and combustion chamber similar in all respect to those in the embodiment of Figure 1 which are not shown and will not be further described. A fresh air blower 9 is driven by motor 13, and forces fresh air drawn from the vehicle exterior via opening 12 through air space 27 and to the vehicle interior through opening 30. A water impeller 29, also driven by motor 13, draws coolant from the engine cooling system, indicated at 22, forces it through liquid space 28 and thence back to the cooling system. A by-pass passage 31 is provided, controlled by a valve 32. When the valve 32 is in the position shown in full lines, coolant can flow through impeller 29, etc., while when valve 32 is in the position shown in broken lines, liquid flow through impeller 29 is prevented.

Again the functioning of the system will be most clearly seen by considering the operation of the heater in starting from cold.

(1) Motor 13 is set to run at full speed, fuel supplied and ignited, and valve 32 set to the position shown in full lines. Heat is thus transferred to the coolant and a minor portion to the air passing to the vehicle interior. When the coolant has reached a suitable temperature the engine can be started.

(2) Valve 32 is moved to the position shown in broken lines. The portion of coolant in space 28 will vaporise, and heat be transferred directly to the air passing to the vehicle interior.

(3) When the vehicle interior reaches the desired temperature the speed of motor 13 is reduced, so reducing the supply of heat to the vehicle interior.

(4) If the supply of heat to the vehicle interior is too great, by-pass valve 32 is set to permit a certain flow of liquid through space 28 (the excess heat then being dissipated through the cooling system).

(5) If the heat supply is still too great the supply of fuel is cut off, so that air passing through space 27 is heated by the engine coolant.

(6) When unheated air is required the by-pass valve 32 is set to prevent the flow of coolant through space 28. It will be seen that the function of valve 32 is quite closely analagous to that of valve 21 in the first embodiment.

We claim:

1. In a heating and ventilating system for vehicles, an engine having a circulating coolant system, a heat exchanging portion in said coolant system, a source of heat independent of said engine and having a ventilating outlet communicating with the vehicle interior, an adjustable valve means adjacent said heat exchanging portion, said valve means being so arranged that substantially all heat from said source of heat is passed to said circulating coolant via said heat exchanging portion in a first extreme valve position, and that substantially all the heat from said source of heat is passed through said outlet to said vehicle interior in a second extreme valve position, intermediate positions of said valve causing a selective apportioning of the heat from said source between said coolant and said ventilating outlet.

2. The system of claim 1 including air blower means adjacent said source of heat, said valve causing substantially all the air from said blower to flow past said heat exchanging portion in said first extreme valve position, and said valve causing substantially all the air from said blower to flow through said ventilating outlet in said second extreme valve position.

3. The system of claim 1 in which said valve is within said circulating coolant system, whereby substantially all of said coolant is permitted to flow through said heat exchanging portion in said first extreme valve position, and substantially all the said coolant is prevented from flowing through the said heat exchanging portion in said second extreme position.

4. The system of claim 1 wherein the source of heat independent of the engine comprises an elongated housing with air inlet and exhaust ducts adjacent the ends thereof, an air blower within said housing, a motor to drive said blower, means to supply liquid fuel to the interior of said housing between said blower and said exhaust duct and means to ignite said fuel.

5. The system of claim 4 wherein the housing is enclosed by a further housing to define an air space therebetween, the air passing to the vehicle interior being forced through said air space.

6. The system of claim 5 comprising a further blower also driven by the motor, said blower serving to force air passing to the vehicle interior through said air space.

7. The system of claim 6, said valve causing substantially all the air from said further blower to flow past said heat exchanging portion in said first extreme valve position, and said valve causing substantially all the air from said blower to flow through said ventilating outlet in said second extreme valve position.

8. The system of claim 7 in which said valve is within said circulating coolant system, whereby substantially all of said coolant is permitted to flow through said heat exchanging portion in said first extreme valve position and substantially all the said coolant is prevented from flowing through the said heat exchanging portion in said second extreme position.

9. The system of claim 8 in which the heat exchanging portion is disposed in the air space between the housing and the further housing.

10. In a heating and ventilating system, an enclosure, an engine having a circulating coolant system comprising a heat exchanging portion, a separate source of heat having a ventilating outlet communicating with said enclosure, an adjustable valve means adjacent said heat exchanging portion, said valve being so arranged that the major part to substantially all heat from said separate source is passed to coolant in said system by means of said heat exchanging portion when said valve is in a first position, and that the major part to substantially all the heat from said separate source is passed through said outlet to said enclosure when said valve is in a second position, said valve being so constructed that positions thereof intermediate said first and second positions selectively apportion the heat from said separate source between said coolant and said ventilating outlet.

11. The combination set forth in claim 10, said enclosure being part of a vehicle, said separate heat source comprising an elongate housing having inlet and outlet openings adjacent the ends thereof and a blower therein.

References Cited in the file of this patent

UNITED STATES PATENTS

| | | |
|---|---|---|
| 2,009,823 | Van Vulpen et al. | July 30, 1935 |
| 2,026,929 | Backe | Jan. 7, 1936 |
| 2,103,835 | Van Vulpen | Dec. 28, 1937 |
| 2,388,210 | Hanson et al. | Oct. 30, 1945 |
| 2,621,857 | Wixon | Dec. 16, 1952 |
| 2,631,517 | Duhn | Mar. 17, 1953 |